United States Patent [19]

LaBounty et al.

[11] Patent Number: 5,127,567
[45] Date of Patent: Jul. 7, 1992

[54] RAIL PROCESSOR

[75] Inventors: Roy E. LaBounty; Kenneth R. LaBounty, both of Two Harbors, Minn.

[73] Assignee: LaBounty Manufacturing, Inc., Two Harbors, Minn.

[21] Appl. No.: 592,530

[22] Filed: Oct. 4, 1990

[51] Int. Cl.$^5$ .............................. B23P 17/02; B26F 3/00
[52] U.S. Cl. .................... 225/96.005; 225/103
[58] Field of Search .................... 225/96.5, 103

[56] References Cited

U.S. PATENT DOCUMENTS

| | | | |
|---|---|---|---|
| 344,735 | 6/1886 | Hill et al. | |
| 1,430,916 | 10/1922 | Mason et al. | |
| 2,309,262 | 1/1943 | Thies | |
| 3,680,486 | 8/1972 | Plasser et al. | 104/1 |
| 3,802,731 | 4/1974 | LaBounty | 294/88 |
| 4,104,792 | 8/1978 | LaBounty | 30/134 |
| 4,198,747 | 4/1980 | LaBounty | 30/134 |
| 4,346,828 | 8/1982 | Crawley | 225/2 |
| 4,383,630 | 5/1983 | Solomon et al. | 225/103 |
| 4,439,921 | 4/1984 | Ramun et al. | 30/134 |
| 4,444,345 | 4/1984 | Solomon et al. | 225/96.5 |
| 4,519,135 | 5/1985 | LaBounty | 30/134 |
| 4,522,323 | 6/1985 | LaBounty | 225/2 |
| 4,552,291 | 11/1985 | Schott | 225/96.5 |
| 4,558,515 | 12/1985 | LaBounty | 30/134 |
| 4,646,954 | 3/1987 | Happ | 225/96.5 |
| 4,720,032 | 1/1988 | LaBounty | 225/96.5 |

FOREIGN PATENT DOCUMENTS

| | | | |
|---|---|---|---|
| 602320 | 4/1978 | U.S.S.R. | 225/96.5 |
| 831430 | 5/1981 | U.S.S.R. | 225/96.5 |
| 941027 | 7/1982 | U.S.S.R. | 225/96.5 |

*Primary Examiner*—Hien H. Phan
*Attorney, Agent, or Firm*—Palmatier & Sjoquist

[57] ABSTRACT

A rail breaker attachable to the boom structure and hydraulic system of a hydraulic excavator and having an elongate frame tiltable by a hydraulic cylinder of the excavator, a grapple and a swingable breaker arm on the outer end of the frame, the grapple having a width to grasp and clamp a length of the rail to immobilize the rail, the lower stationary jaw of the grapple having a hardened fulcrum blade over which the rail is broken, the upper jaw of the grapple having a nicking blade to put a nick in the rail to be broken, and the breaker arm swinging against the extended portion of the rail which is being clamped by a grapple to break the rail at the nick produced and over the fulcrum blade.

11 Claims, 2 Drawing Sheets

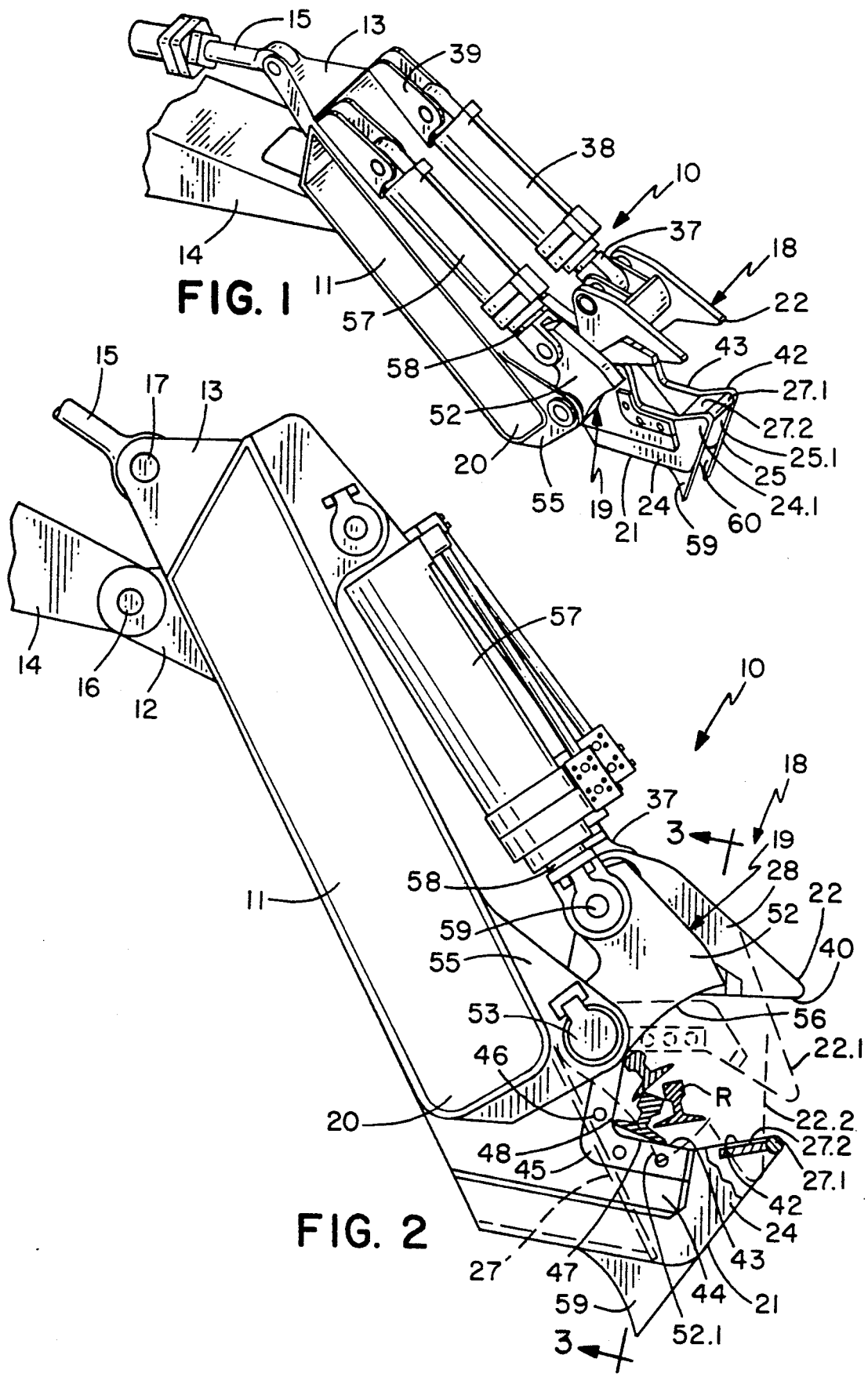

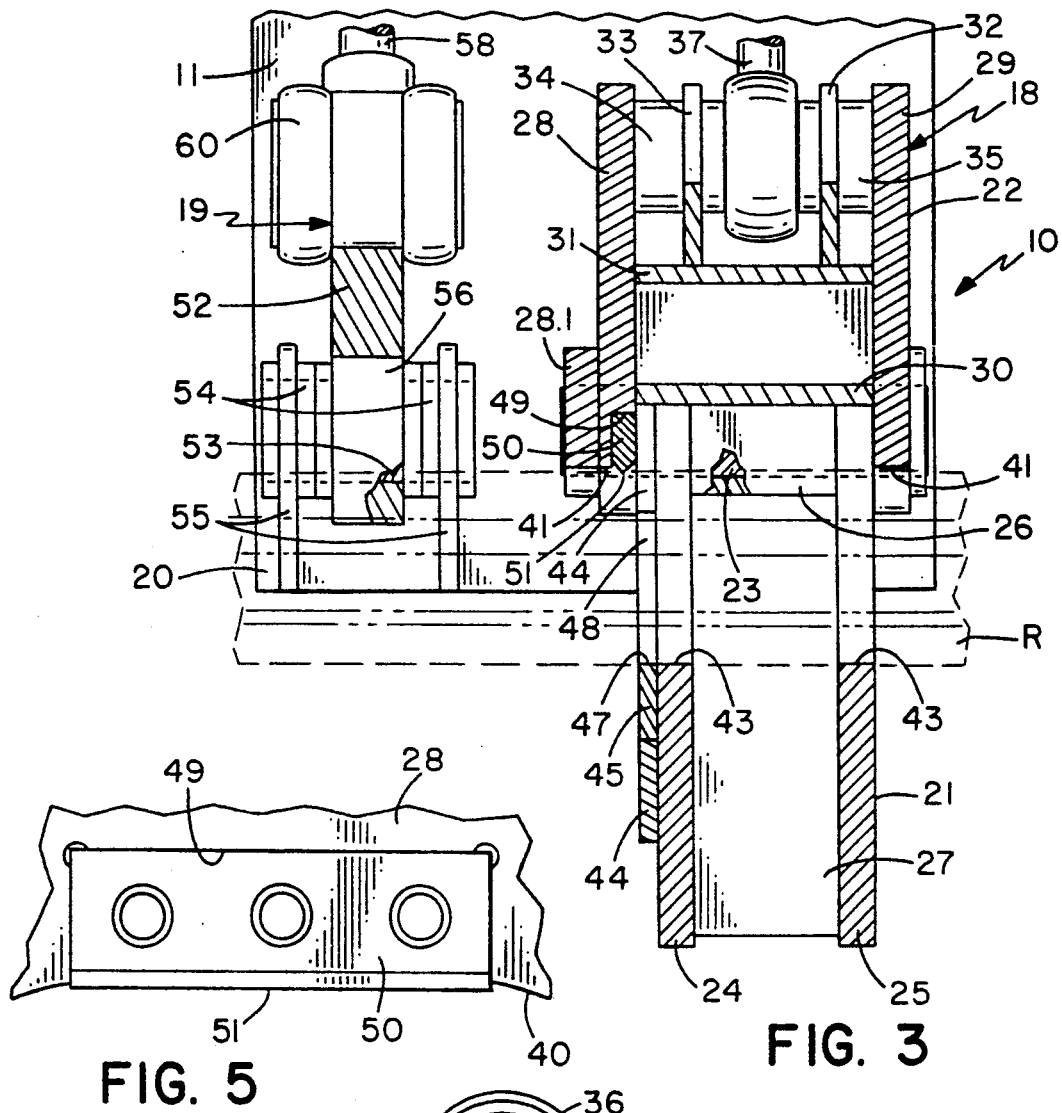
FIG. 3
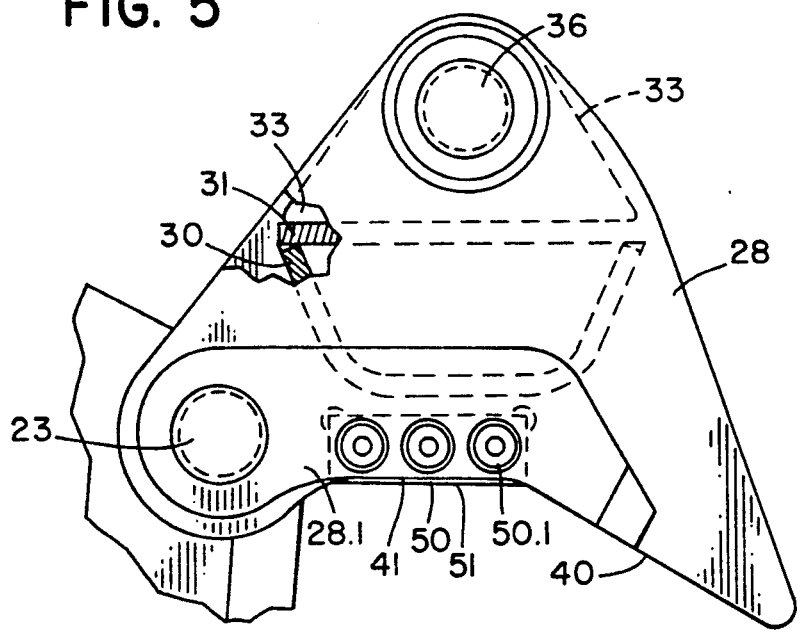
FIG. 5
FIG. 4

RAIL PROCESSOR

This invention relates to a rail breaker or as an attachment for a hydraulic excavator.

BACKGROUND OF THE INVENTION

Railroad track rails are made of a high carbon steel which makes the tracks more brittle than many other types of steel, such as used in I-beams and columns in building structures. Such track rails can be torn up and reclaimed when a section of railroad track is abandoned, but in order to conveniently handle such tracks, they must be reduced in size to lengths that are manageable to be easily hauled. Accordingly, the long lengths of rail must be reduced in size to four to six foot lengths or other reasonably short lengths so that they can be easily picked up by grapples and other types of machinery and loaded into railroad cars or trucks, or other hauling and handling facilities.

There have been prior devices for breaking rails into shorter lengths and in some instances such devices have been intended to be attached to the boom structure of a hydraulic excavator. For instance, U.S. Pat. No. 4,720,032 discloses such a portable rail breaker capable of holding a rail, producing a notch or nick in one side of the rail and then breaking off a length of the rail over a fulcrum; but the rail breaker disclosed in the patent makes the handling of the rail cumbersome at best. Another device is disclosed in U.S. Pat. No. 4,439,921 which comprises a rail breaking attachment for backhoes. Again, this device makes the handling of rails extremely cumbersome, and it appears that operation of the device creates substantial safety problems due to the flying of broken rail parts.

Other rail breakers are illustrated in U.S. Pat. Nos. 4,522,323; 4,346,828; and 4,444,345. All of these disclosures facilitate handling the rail by simply sliding the rail along its length, but without any other efficient means of manipulating the rail. Each of the foregoing three patents operate by producing a nick or a notch in the rail and then breaking off the rail at the notch produced. Similarly, the rail lifting and cutting machine in U.S. Pat. No. 4,383,630 receives the rail by sliding and then simply breaks the rail over a fulcrum, and without nicking the rail.

Other patents which disclose nicking a rail and then breaking it are three Russion patents, SU-602-320; SU-941-027; and SU-831-430. U.S. Pat. No. 344,735 discloses the process of nicking the rail in a longitudinal direction so as to facilitate breaking the head away from the base.

Other marginally relevant patents relating generally to performing functions with track rails are U.S. Pat. Nos. 1,430,916; 2,309,262; and 3,680,486; 3,802,731; 4,519,135; and 4,558,515.

SUMMARY OF THE INVENTION

An object of the invention is to provide an attachment for a mobile machine, such as a hydraulic excavator, for breaking track rails and other long pieces of heavy rigid steel into short lengths that can be easily loaded and transported for recycling.

A feature of the invention is an attachment tool to be mounted on and connected to the boom and hydraulic system of a hydraulic excavator and which has a pair of relatively movable clamping jaws to grip along a length of an elongate rail. A breaker arm is swingably mounted adjacent the clamping jaws to confront a portion of the rail extending from the clamping jaw, and the clamping jaws having a rail nicking or notching blade and a fulcrum portion over which the breaker arm breaks the rail adjacent the nick which has been formed. The clamping jaws and breaker arm are operated by separate hydraulic cylinders.

The piece of rail being broken off is directed downwardly toward the ground to minimize the possibility of causing injury or damage to persons or nearby facilities.

Another feature of the invention is the L-shaped arrangement of the supporting faces of the stationary clamp arms and the corresponding L-shape of the fulcrum blade, which accommodates gathering of a number of rails into a cluster, and in a single operation causing the rails to be nicked and then broken off by the breaker arm which is spaced from the fulcrum blade.

BRIEF DESCRIPTION OF THE DRAWINGS

FIG. 1 is a perspective view of the attachment shown mounted on the boom structure of a hydraulic excavator.

FIG. 2 is a side elevation view thereof and having portions broken away and shown in section for clarity of detail.

FIG. 3 is an enlarged detail section view taken approximately at 3—3 of FIG. 2 and with the upper clamp arm of the attachment in partially closed condition, substantially in the dotted line position of FIG. 2.

FIG. 4 is an enlarged side elevation view of the swinging clamp arm of the attachment.

FIG. 5 is a detailed elevation view of the rail-nicking blade.

DETAILED SPECIFICATION

One form of the invention is illustrated and described herein, and the rail processor or breaker is indicated in general by the numeral 10.

Although the breaking or processing tool 10 is described in terms of a rail breaker or processor, it should be understood that the tool 10 is useful in breaking other elongate hardened steel or similar elements, and accordingly, wherever the term "rail" is used herein, the term is meant to include track rails, but also other types of elongate elements which may be of a somewhat brittle nature and are to be broken into shorter lengths for ease of handling are also included.

The rail breaker 10 includes an elongate frame 11 which is generally box-shaped and suitably internally braced to be rigid. The frame 11 has brackets 12 and 13 affixed as by welding onto its rear portions. Bracket 12 is for attaching the frame to the boom or stick arm 14 of a hydraulic excavator, backhoe, front end loader or other mobile equipment that provides similar function. Bracket 13 is for attaching the frame 11 to the piston rod 15 of the hydraulic cylinder which serves to orient the frame 11 with respect to the boom structure 14. Both of the brackets 12 and 13 have suitable pivot pins 16 and 17 respectively for mounting the attachment to the boom and piston rod respectively.

The rail breaker 10 also has a grapple 18 and a breaker arm 19 in side-by-side relation and affixed to the outer end portion 20 of the frame 11.

The grapple 18 includes a stationary lower jaw 21 affixed on the frame 11 and a swingable upper jaw 22 mounted on a pivot pin 23 supported by the two rigid jaw plates or panels 24 and 25 of the lower jaw 21, which plates are affixed as by welding to the frame 11.

The jaws 21 and 22 extend generally endways of the elongate frame and from the outer end 20 thereof. A bushing tube 26 is welded to and extends between the two plates 24, 25 and receives the mounting pin 23 therein.

A frame plate 27 extends between and is welded to the jaw plates 24, 25 for strengthening the lower jaw 21. In addition, a rigid tie bar 27.1 extends between and is welded to the tip ends 24.1, 25.1 of the lower jaw plates 24, 25. A tie plate 27.2 also extends between and is welded to the lower jaw plates 24, 25 adjacent the tie bar 27.1. The tie bar 27.1 and tie plate 27.2 reinforce and stiffen the lower jaw plates and obstruct the space therebetween to prevent rails or short pieces thereof from entering the space between the lower jaw plates.

The upper jaw 22 also has a pair of rigid side plates or panels 28 and 29 mounted on the pin 23 so as to be swingable with respect to the lower jaw 21. The jaw plates 28 and 29 are affixed to each other and interconnected by a generally U-shaped reinforcing plate 30, the ends of which are welded to the jaw plates 28, 29; and an additional frame plate 31 overlies the frame plate 30 and is also welded to both of the jaw plates 28, 29. A pair of additional internal bracing plates 32, 33 are arranged parallel to the jaw plates 28, 29 and are welded to the bracing plate 31, and also welded to a pair of bushing tubes 34, 35 which receive the connector pin 36 by which the upper jaw 22 is connected to the piston rod 37 of hydraulic cylinder 38 which is connected to the frame 11 by brackets 39. The hydraulic cylinder 38 is powered and controlled by hydraulic fluid under pressure and valves operated in the hydraulic excavator machine of which the boom 14 is a part.

It will be recognized that the width of the grapple 18, i.e., the spacing between jaw panels 28 and 29, and between panels 24 and 25, is of the same general order of magnitude as the spacing between the breaker arm 19 and the grapple 18. The wide width of the grapple 18 is important for immobilizing the rails relative to the grapple during breaking of the rails. The wide spacing between the breaker arm 19 and grapple 18 provides leverage at the rail in order to create breaking forces on the rail under influence of the breaker arm 19.

The jaw plates 28, 29 have jaw faces 40, 41 which extend obliquely to each other. The lower stationary jaw 21 also has jaw faces 42, 43 which extend obliquely to each other. The jaw faces 40-43 cooperate with each other in clamping a rail or a cluster of rails R which are to be broken; and the oblique relationship of the jaw faces urge the rails inwardly toward the pivot 23 as the upper jaws are closed onto the lower jaws.

A rigid seating plate 44 is welded onto the outer face of the lower jaw plate 24 and provides a seat for a replaceable hardened steel fulcrum plate 45 which also serves as a wear plate for the jaw face 43. The fulcrum plate 45 is fastened to the lower jaw plate 24 by bolts 46.

It should be recognized that the fulcrum plate 45 is generally L-shaped and defines rail engaging faces 47, 48 which extend transversely to each other and cooperatively define a substantial V-shape. The rail engaging face 48 is oriented to obstruct movement of the rails R from the fulcrum plate toward the pivot defined by the pin 23.

The upper swingable jaw 22 is arranged so that the jaw plate 28 will swing downwardly along and to the outside of the seating plate 44. The plate 28 also is recessed adjacent its jaw face 41 to define a blade seat 49 to mount the replaceable hardened steel nicking blade 50 which is located opposite the fulcrum blade 45, but slightly offset from the fulcrum blade. The nicking blade has a sharpened edge 51 which protrudes slightly below the jaw face 41 of the upper jaw plate 28. The nicking blade 50 is formed of high carbon, extremely hard steel, and is held on the jaw plate 28 by a plurality of bolts 50.1 so that the nicking blade can be readily replaced when it becomes worn.

The jaw plate 28 also has a stiffening plate 28.1 welded against the outer face of plate 28 adjacent the nicking blade and the seat 49 which is recessed into the plate 28. The stiffening plate 28.1 serves to stiffen the plate 28 where metal was cut away in order to define the seat 49.

With reference to FIG. 2, the upper jaw 22 is shown, in full lines, in its fully open position; and FIG. 2 shows two shifted positions of the upper jaw in dashed lines, the first shifted position is being indicated by the numeral 22.1 showing the jaw in a partially closed condition for grasping the rails as illustrated, and an additional shifted position is indicated by the numeral 22.2 which illustrates that the outer end of the upper jaw bypasses the outer tip ends of the lower jaw as the rails are clamped under pressure.

The breaker arm 19 includes a rigid plate 52 which is mounted independently of the grapple 18 and is supported by a pivot pin 53 mounted in bearing tubes 54 supported by bracket plates 55 which are affixed as by welding to the frame 11. The mounting pins 53 of the breaker arm and pin 23 of the grapple 18 are aligned with each other and their axes are co-linear. The breaker arm plate 52 has a broad, but curved face 56 as to traverse the rail or rails supported on the lower grapple jaw. In FIG. 2, a shifted position of the breaker arm plate is illustrated by the dotted lines 52.1, to show the relationship to the fulcrum plate 45 when the breaker arm 19 is fully swung to its nearly maximum position. The breaker arm plate 52 is operated by a separate hydraulic cylinder 57, the piston rod 58 of which is connected to the breaker arm plate 52 by a pin 59 and the bearing assembly 60 on the end of the piston rod. The hydraulic cylinder 58 is connected by hydraulic hoses and valves to the hydraulic system of the hydraulic excavator to be controlled from the cab of the machine.

Each of the lower jaw plates have rigid hook shaped extensions 59, 60 protruding downwardly and away from the tip ends 24.1, 25.1 for raking rails out of a pile to render them more accessible to be picked up by the grapple 18.

In the operation of the rail breaker and processor 10, the frame and grapple will be tilted in a clockwise direction from that illustrated in FIG. 2 so that the grapple 18 can pick one or a number of rails off the ground or out of a pile of rails. A skilled operator of the machine can easily pick up three rails which can be processed simultaneously. It has been experienced with the rail breaker 10, that three rails classified as 130 pound rails can be simultaneously processed and broken into short lengths. Of course small or lighter weight rails used with a small trains and from various other sources can also be broken into short lengths through the use of this rail breaker 10.

It has been found helpful, but not necessary, to use a platform or a pallet in the scrap yard adjacent the pile of rails as to support, temporarily, those rails which are being processed into smaller pieces. A cluster of three rails may be grasped by the grapple 18 and placed upon such a pallet or table. Then by opening the jaws and swinging the rail breaker to the side, by swinging the boom structure 14 and swing house of the backhoe or excavator, the grapple may be moved along the length of the rails being processed so that initially the grapple will clamp the rails at a location six to ten feet from the end of the cluster of rails. When the grapple 18 clamps down on the cluster of rails, the rails are drawn together in a tight cluster and it has been found that the nicking blade 50 will engage and produce a nick in more than one of the rails at the same time. As the upper jaw 22 is clamped down onto the rails, the rails are pressed firmly against the jaw faces 42, 43 and particularly against the rail engaging face 47 of the fulcrum blade 45. In this position, the cluster of rails are firmly clamped while the breaker arm 19 is operated. The cylinder 57 is extended to swing the breaker arm 19 toward the dotted line position 52.1 thereof. When the rail engaging face 56 of the plate 52 engages the rails, the breaker arm 19 continues to swing and the rails will be broken off over the fulcrum blade 45 and closely adjacent the nick produced by the nicking blade 50.

During the breaking of the rail, the rail breaker 10 will be oriented substantially in the position illustrated in FIGS. 1 and 2, and in this position, the force exerted by the breaker arm 19 is directed in a downwardly direction so that as the pieces of rail are broken off the longer length, these broken-off pieces which are then loose will simply fall downwardly onto the ground without any significant likelihood of encountering anything that could be damaged. Depending upon the arrangement of the cluster of rails R being grasped by the grapple 18, certain of the rails may be broken off over the face portion 47 of the fulcrum blade 45 and other of the rails may be broken over the upright face portion 48 of the fulcrum blade. Because of the L-shaped arrangement of the fulcrum blade and of the rail engaging faces 47, 48, the rails are kept under close control and in the proper location for utilizing the full potential of the breaker arm 19.

It should be recognized that during the rail breaking process, all of the jaw plates 28, 29 and 24, 25 will be clamping a length of the rail. The width of the upper jaw 22, between the plates 28 and 29, establishes a substantial length of the rail which is firmly gripped by the upper and lower jaws 22, 21, so that the swinging of the breaker arm 19 will simply cause the rails R to break off at the fulcrum plate 45 and the portions of the rail to the right of the grapple 18 as illustrated in FIGS. 1 and 3, will not move appreciably. The portions of the rails which are not being broken at the moment, remain in a tight cluster and are held stationary.

After lengths of the rails have been broken over the fulcrum plate 45, the grapple 18, which is still in grasping relationship with the rails R, will be swung to the side as the boom structure 14 of the hydraulic excavator is also swung to the side so as to bring another length of rail along the table or pallet so that an additional bite can be taken at the rail. After the rails have been moved along a few feet, the grapple 18 is loosened from the rails and the grapple is swung along the stationary rails to grasp the rails at a new location. Again, six to ten feet of rails will be extending from the grapple 18, past the breaker arm 19 to be broken off again. The grapple 18 is again closed onto the cluster of rails R so that the nicking blade will again produce a nick in the rails opposite the fulcrum plate so that when the breaker arm 19 is again operated, the new lengths of rails will be again broken off at the nick produced and over the fulcrum plate 45.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

I claim:

1. A rail breaker for attachment to the boom structure and hydraulic system of a hydraulic machine, comprising elongate frame means comprising an inner portion attachable to such a machine and an outer portion, upper and lower jaw portions affixed on the outer portion of the frame means and having a width to clamp along a length of the rail and immobilize the rail with respect to the frame means, at least the upper jaw portion being swingable toward and away from the lower jaw portion to receive a rail transversely therebetween for clamping and releasing the rail with the lower jaw portion, and a powered breaker arm portion swingable mounted on the outer portion of the frame means in side-by-side and spaced related with the jaw portions to engage and break the rail clamped by said jaw portions, the breaker arm being adjacent the upper jaw portion to apply breaking force against the rail and toward the lower jaw portion, the lower jaw portion comprising a fulcrum portion engageable with the rail, the fulcrum portion comprising a pair of rail engaging face portions extending transversely of each other, one of said face portions of the fulcrum portion being oriented to obstruct the shifting of the rail along the lower portion and toward the swing axis of the breaker arm portion.

2. A rail breaker according to claim 1 wherein the breaker arm portion comprises a breaker face portion to confront the rail engaging face portions of the fulcrum portion.

3. A rail breaker for attachment to the boom structure and hydraulic system of a hydraulic machine, comprising elongate frame means comprising an inner portion attachable to such a machine and an outer portion, upper and lower jaw portions affixed on the outer portion of the frame means and having a width to clamp along a length of the rail and immobilize the rail with respect to the frame means, at least the upper jaw portion being swingable toward and away from the lower jaw portion to receive a rail transversely therebetween for clamping and releasing the rail with the lower jaw portion, said jaw portions comprising side panel portions spaced from each other in a direction transversely of said elongate frame means for engaging spaced portions at opposite ends of said length of the rail, and a powered breaker arm portion mounted on the outer portion of the frame means in side-by-side and spaced relation with the jaw portions to engage and break the rail clamped by said jaw portions.

4. A rail breaker for attachment to the boom structure and hydraulic system of a hydraulic machine, comprising elongate frame means comprising an inner portion attachable to such a machine and an outer portion, upper and lower grapple portions on the outer portion of the elongate frame means, the upper portion being swingably mounted to clamp and release a rail onto and from the lower jaw portion, the lower jaw portion being stationary on the frame means and comprising a V-shaped rail engaging face with inner and outer face portions extending transversely of each other to restrict shifting of the rail along the lower jaw portions, both the upper and lower jaw portions having rail engaging face portions extending obliquely of the swing axis of the upper jaw to urge the rails toward the axis when the upper jaw is being closed, and a powered breaker arm mounted on the outer portion of the frame means in side-by-side and spaced relation with the jaw portions to engage and break the rail clamped by said jaw portions.

5. A rail breaker for attachment to the boom structure and hyraulic system of a hydraulic machine, comprising an elongate frame means comprising an inner portion attachable to the boom structure and an outer portion, first and second hydraulic cylinder portions on the frame means, a grapple portion and a breaker arm portion in spaced and side-by-side relation to each other on the outer portion of the frame means, a grapple portion comprising side portions spaced from each other for engaging and clamping a length of the rail to restrain the rail against movement, the grapple portion also comprising a lower grapple jaw affixed to the frame means and an upper grapple jaw swingable relative to the frame means and operated by said first hydraulic cylinder portion, the grapple portion also comprising a nicking blade portion and a fulcrum portion on one of said side portions adjacent the breaker arm portion, said nicking blade portion being affixed on the upper grapple jaw, and said fulcrum portion being formed on said lower grapple jaw, and the breaker arm portion being swingable and operated by said second hydraulic cylinder portion.

6. A rail breaker according to claim 5 wherein the fulcrum portion comprises rail engaging surface portions extending transversely of each other to define a pocket receiving and restraining shifting of the rails during breaking of the rails.

7. A rail breaker according to claim 5 wherein the lower jaw portion comprises side panel portions with end portions protruding outwardly from the swing axis of the upper jaw portion, and tie bar portions extending between and affixed to said end portions of the side panel portions.

8. A rail breaker according to claim 5 wherein said side portions comprise panel portions on the upper and lower jaw portions, said panel portions on the upper jaw portion being spaced apart by said length of rail as to clamp the rail at opposite ends of the length, the panel portions on the lower jaw being spaced apart a distance similarly to the spacing between the upper jaw panel portions.

9. A rail breaker according to claim 5 wherein the spacing between the breaker arm portion and the grapple portion is of a similar order of magnitude as the width of said grapple portion between the side portions thereof.

10. A rail breaker according to claim 5 wherein the lower grapple jaw portion comprises a rigid projection extending away from said fulcrum portion for manipulating rails out of a pile to arrange such rails to be picked up by the grapple portion.

11. A rail breaker for attachment to he boom structure and hydraulic system of a hydraulic machine, comprising an elongate frame means comprising an inner portion attachable to the boom structure and an outer portion, upper and lower jaw portions affixed on the outer portion of the frame means and having a width to clamp along a length of the rail and immobilize the rail with respect to the frame means, at least the upper jaw portion being swingable toward and away from the lower jaw portion to receive a rail transversely therebetween for clamping and releasing the rail with the lower jaw portion, a powered breaker arm portion mounted on the outer portion of the frame means in side-by-side and spaced relation with the jaw portions to engage and break the rail clamped by said jaw portions, the lower jaw portion comprising a replaceable rail engaging portion adjacent the breaker arm portion and providing a fulcrum portion over which the rail is broken, said replaceable rail engaging portion being substantially V-shaped to restrict movement of the rails on the lower jaw portion when the rails are clamped by the upper jaw portion.

* * * * *

UNITED STATES PATENT AND TRADEMARK OFFICE
CERTIFICATE OF CORRECTION

PATENT NO. : 5,127,567

DATED : July 7, 1992

INVENTOR(S) : Roy E. LaBounty, et al

It is certified that error appears in the above-identified patent and that said Letters Patent is hereby corrected as shown below:

Column 6, line 27, delete "related" and insert --relation--.

Column 8, line 25, delete "he" and insert --the--.

Signed and Sealed this

Second Day of November, 1993

Attest:

BRUCE LEHMAN

*Attesting Officer*  *Commissioner of Patents and Trademarks*